United States Patent Office 3,415,329
Patented Dec. 10, 1968

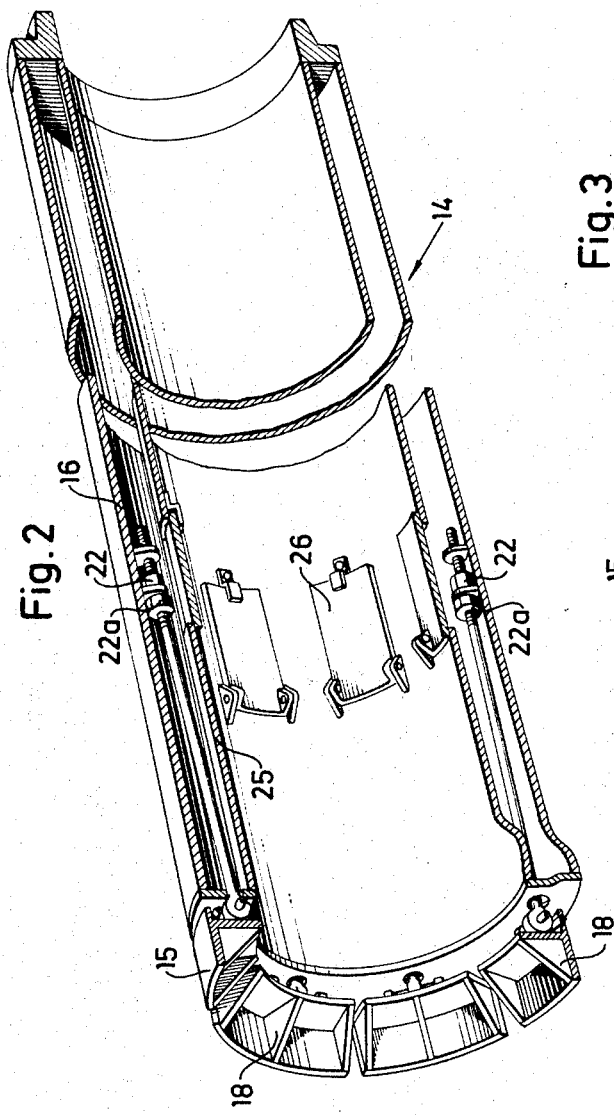
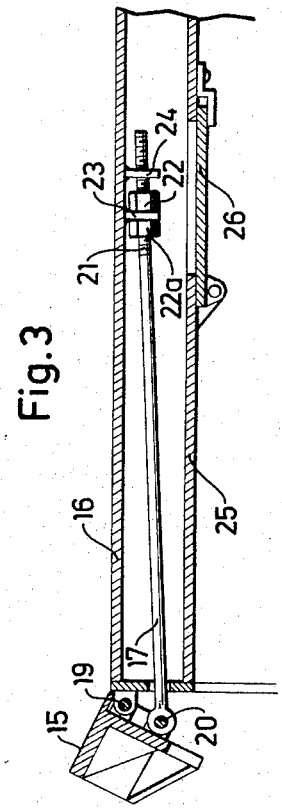

3,415,329
METHOD AND AN APPARATUS FOR INSTALLING UNDERGROUND PIPES
Göran Mårlind, Goteborg, Sweden, assignor to AB Vavra Hydraulteknik, Goteborg, Sweden
Filed Jan. 13, 1967, Ser. No. 609,190
Claims priority, application Sweden, Jan. 20, 1966, 711/66
8 Claims. (Cl. 175—19)

ABSTRACT OF THE DISCLOSURE

This invention relates to an elongated sleeve member useful in connection with the installation of underground pipes, the back end of said sleeve being adapted to be mounted on the foremost end of the pipeline, the front end of said sleeve being provided with guide means for guiding the direction of penetration of said sleeve through the earth, adjustment means associated with said sleeve and mounted to the rear of said guiding means, and means interconnecting said guiding means and said adjustment means.

---

The present invention relates to the installation of underground pipes according to a method which eliminates the need of digging a trench along the entire length of the pipe. The present invention involves advancing a ground starting from a hole containing suitable equipment. Generally, that equipment includes one or more hydraulic pressure cylinders or jacks. The present invention is also characterized by the fact, that the pipeline is successively elongated by addition of further pipe sections at a rate determined by the advancement of the pipeline through the ground.

When performing installation works of the kind above defined it is customary to provide the foremost pipe section with a sleeve for the purpose of reducing the frictional resistance to which the pipeline is subjected when forced forward by the hydraulic cylinders. For that purpose it is usual to make the front edge of the sleeve as a more or less sharp edge whereby a certain "chisel action" is attained. Another purpose of such a sleeve has been to offer the possibility of controlling the direction in which the pipeline penetrates as well as the grade thereof. In this way it has been feasible to compensate for deviations which might arise during the progress of the work. However, practical tests with such sleeves have shown that they are open to some severe objections.

The main object of the present invention is to provide a method and an apparatus which makes it possible to perform the installation work with a greater accuracy and speed than has so far been feasible whereby the potential field of use of the method is broadened and the corresponding costs reduced. A primary feature of the present invention is that the sleeve above referred to has its front end provided with adjustable guiding means so that the effective cross-sectional shape of the sleeve can be varied.

One embodiment of the invention will now be described in greater detail, reference being made to the accompanying drawings, wherein:

FIGURE 2 shows a fragmentary perspective view partly in section of a sleeve designed according to the present invention.

FIGURE 3 shows in greater detail a fragmentary partly in section of the sleeve illustrated in FIGURE 2.

Figure 1:
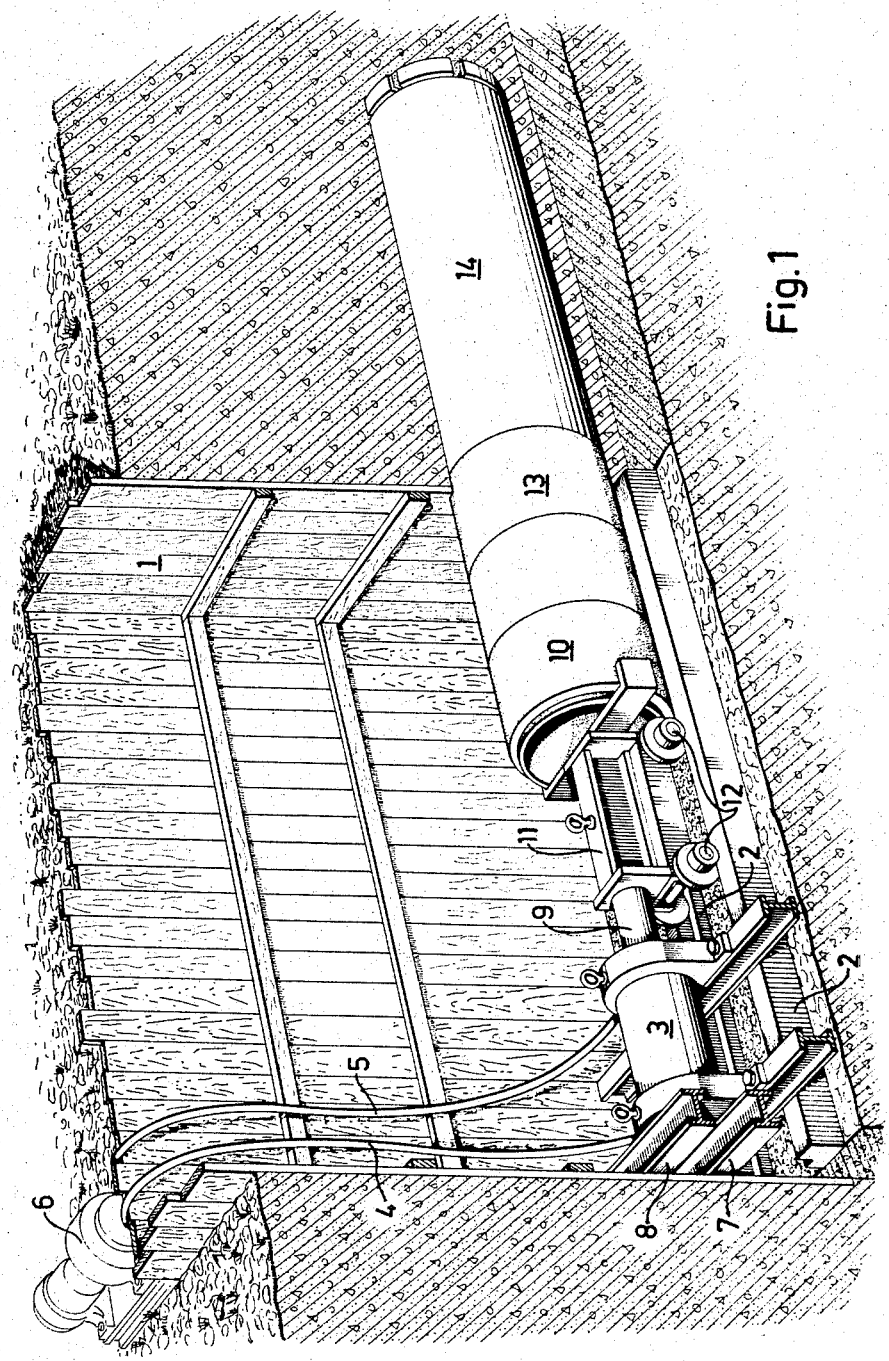
FIGURE 1 is a perspective view partly in section showing a complete system for installation of a concrete pipeline as above specified.

In FIGURE 1 a hole in the ground is shown which is provided with an interior protective timber cover 1. On the bottom of the hole there are two parallel rails 2 forming a guide path and, before initiation of the advancement of the pipeline, oriented in the desired direction of penetration.

Reference numeral 3 designates an hydraulic cylinder which via hoses 4 and 5 is connected to a suitable hydraulic pressure source 6. Behind the hydraulic cylinder 3 there are two transverse bars 7 and 8 which serve to absorb and distribute the reactional forces generated when the cylinder is in operation. According to FIGURE 1 there is between the piston 9 of the hydraulic cylinder 3 and the rearmost section 10 of the pipeline a device 11 which can easily be removed and in a manner readily understood increases the effective maximum strike of the hydraulic cylinder. In the example shown the device 11 has rollers 12 for movement along rails 2. The foremost pipe section 13 is provided with a sleeve 14. The apparatus and method described thus far are known in the prior art.

FIGURE 2 illustrates a sleeve 14 designed according to the present invention and provided with guiding means 15. The latter are circumferentially spaced around the front surface of the sleeve. In FIGURE 2 said means 15 are in the normal or neutral positions in which, as appears from the drawing, portions of them are co-planar with the cylindrical surface of the sleeve 14.

FIGURE 3 shows a fragmentary section through the sleeve and does more clearly than FIGURE 2 illustrate the arrangement of the guiding means 15. Thus, it appears from FIGURE 3 that each of those guiding means could be described as having in cross-section substantially the shape of an angular lever, the radial portion of which is connected to an adjusting member, viz a rod 17. Between the radial and the axial portion of each guiding member there are arranged a number of reinforcing vanes 18. Each guiding member 15 is pivotably connected to sleeve 14 by means of a tangential pivot 19. A bolt 20, parallel to pivot 19, forms a pivot between member 15 and rod 17. The latter does at its rearmost end comprise a threaded portion 21 engaging a nut 22 which is located between two abutments 23 and 24 secured to the inner wall of sleeve 14. Reference numeral 22a designates a lock nut. In this way the guiding members 15 may be locked in their various adjusted positions.

According to the illustrated embodiment of the invention sleeve 14 has double walls, i.e. it does in excess of the outer wall 16 also comprise an inner wall 25. Between walls 16 and 25 there is accordingly formed a space of angular cross-section. As appears from FIGURES 2 and 3 the control rods 17 and their related locking means 21–24 are housed within that space. This arrangement yields two important functions. Firstly, the control rods do not form any obstruction during use of the device and, secondly, the rods are themselves protected against being jammed or damaged by the earth material which during the advancement of the pipeline is released and removed through the interior thereof. Thanks to the fact that there is adjacent to each nut 22 a lid or cover 26 it is possible to adjust the guiding members 15 during operation.

The embodiment of the invention above described and shown on the drawing is intended only to illustrate the basic inventive idea without any limitation. Naturally, a great many modifications can be made. By way of example, it can be mentioned that the circumferential spacing between the individual guiding members 15 can be varied to a great extent depending on the actual circumstances. Further, the control rods 17 can be provided with other protective housings other than those formed due to the presence of double walls of the sleeves. Moreover, when the latter design is used it is not necessary for the sleeve to have double walls along the entire length thereof. Finally, it is obvious that the shape and arrangement of the guiding members can be varied in a great many ways. The only important characteristic is that they are disposed at the front surface of the sleeve.

What is claimed is:

1. An elongated sleeve member useful in connection with the installation of underground pipes:
   (a) the back end of said sleeve being adapted to be mounted on the foremost end of the pipeline,
   (b) the front end of said sleeve being provided with guide means for guiding the direction of penetration of said sleeve through the earth,
   (c) adjustment means associated with said sleeve and mounted to the rear of said guiding means, and
   (d) means interconnecting said guiding means and said adjustment means.

2. A sleeve member according to claim 1 wherein there are a plurality of spaced apart guide means located around the front peripheral edge of said sleeve.

3. A sleeve member according to claim 2 wherein each of said separate guide means is operatively connected to a separate adjustment means.

4. A sleeve member according to claim 2 wherein each guide means has the cross-section of an angular lever one arm of which is connected to adjustment means.

5. A sleeve member according to claim 2 wherein elongated rods interconnect said guiding means and adjustment means, said rods being arranged approximately parallel to the longitudinal axis of the sleeve and having their front ends pivotally connected to said guiding means and the rear ends of said rods being connected to said adjustment means.

6. A sleeve member according to claim 5 wherein the rear ends of said rods are threaded and engage nuts which are adapted to cooperate with fixed abutments.

7. A sleeve member according to claim 1 wherein said sleeve member is composed of spaced apart inner and outer walls between which are housed said adjustment means and said interconnecting means.

8. A sleeve member according to claim 7 wherein elongated rods interconnect said guiding means and adjustment means and the rods are housed between said inner and outer walls.

References Cited

UNITED STATES PATENTS

| | | | |
|---|---|---|---|
| 207,122 | 8/1878 | Julien | 175—202 |
| 744,763 | 11/1903 | Karns | 175—384 X |
| 1,413,503 | 4/1922 | Stevens | 175—19 |
| 1,468,774 | 9/1923 | Caldwell | 175—384 X |
| 1,896,109 | 2/1933 | Simmons | 175—284 |
| 1,948,707 | 2/1934 | Gilman | 175—62 X |
| 2,693,345 | 11/1954 | Martin et al. | 175—384 |
| 3,023,820 | 3/1962 | Desvaux et al. | 175—55 |
| 3,356,167 | 12/1967 | Trent | 175—62 X |

JAMES A. LEPPINK, *Primary Examiner.*

R. E. FAVREAU, *Assistant Examiner.*

U.S. Cl. X.R.

175—61, 62, 73, 285, 384